United States Patent
Matsumura

(10) Patent No.: US 9,457,623 B2
(45) Date of Patent: Oct. 4, 2016

(54) PNEUMATIC TIRE FOR RUNNING ON ROUGH TERRAIN

(71) Applicant: Sumitomo Rubber Industries, Ltd., Kobe-shi, Hyogo (JP)

(72) Inventor: Sadahiko Matsumura, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 397 days.

(21) Appl. No.: 13/872,306

(22) Filed: Apr. 29, 2013

(65) Prior Publication Data
US 2013/0306207 A1 Nov. 21, 2013

(30) Foreign Application Priority Data
May 18, 2012 (JP) .................... 2012-114803

(51) Int. Cl.
*B60C 11/03* (2006.01)
*B60C 11/11* (2006.01)
*B60C 11/13* (2006.01)

(52) U.S. Cl.
CPC ............ *B60C 11/11* (2013.01); *B60C 11/1315* (2013.04); *B60C 2200/10* (2013.04); *B60C 2200/14* (2013.04)

(58) Field of Classification Search
CPC ..................... B60C 11/11; B60C 11/0306
See application file for complete search history.

(56) References Cited

U.S. PATENT DOCUMENTS

| D40,586 S | * | 3/1910 | Kempshall ................ D12/503 |
| 2008/0283167 A1 | | 11/2008 | Matsumura |
| 2008/0283168 A1 | * | 11/2008 | Matsumura ............ 152/209.12 |
| 2010/0319826 A1 | * | 12/2010 | Idei ....................... 152/209.15 |

FOREIGN PATENT DOCUMENTS

JP    2008-279996 A    11/2008

* cited by examiner

*Primary Examiner* — Michael H Wilson
*Assistant Examiner* — Kendra Ly
(74) *Attorney, Agent, or Firm* — Birch, Stewart, Kolasch & Birch, LLP

(57) ABSTRACT

A pneumatic tire for rough terrain comprises a tread portion with a tread pattern provided with a block having a height of from 10 to 19 mm, the block comprising a top face and a sidewall face extending radially inwardly from a peripheral edge of the top face, the top face being a polygonal shape with a plurality of sides equal to or more than four, the sidewall face comprising a plurality of slant surfaces extending radially inwardly away from the sides, respectively, wherein each slant surface comprises a radially outer portion and a radially inner portion, the radially outer portion has a flat plane, the radially inner portion comprises a first plane and a second plane laterally adjacent to said first plane, and the first plane and second plane cross each other so that said radially inner portion dents inwardly of the block.

4 Claims, 6 Drawing Sheets

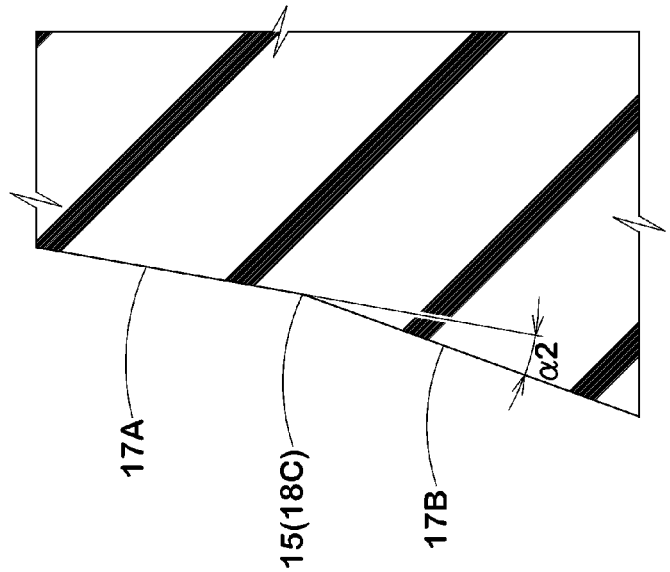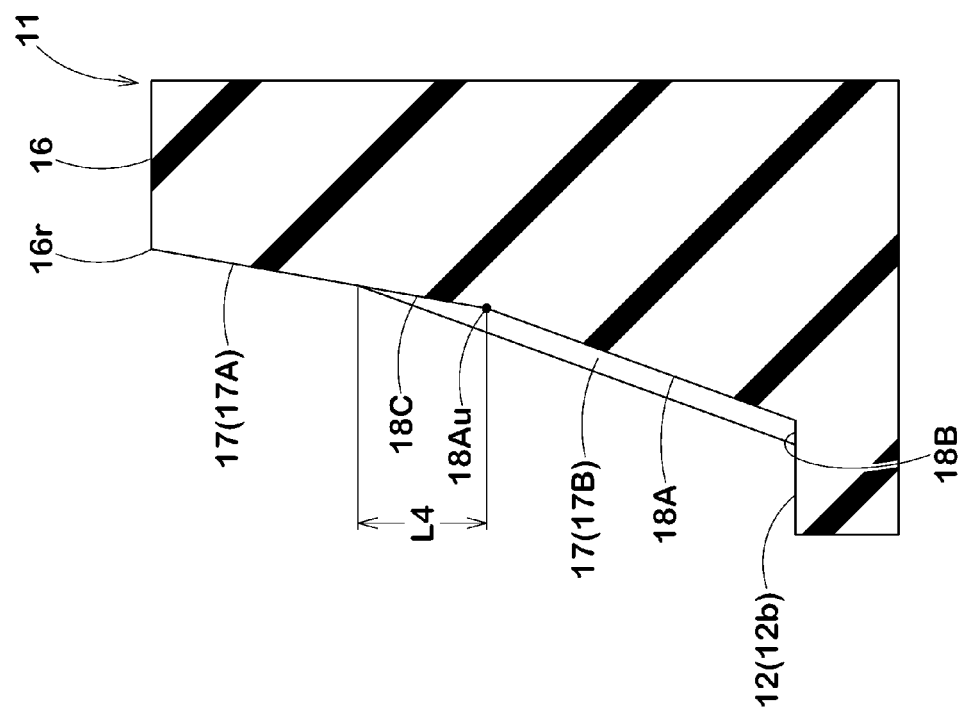

PNEUMATIC TIRE FOR RUNNING ON ROUGH TERRAIN

BACKGROUND OF THE INVENTION

1. Field of the Invention

The present invention relates to a pneumatic tire, more particularly to a structure of the tread portion designed for use on rough terrain and provided with specifically configured blocks capable of improving the durability while maintaining braking and cornering performance.

2. Description of the Related Art

In general, pneumatic tires for off-road vehicles have block tread patterns with a plurality of blocks. Typically block tread patterns have a relatively low land ratio which means that the blocks are arranged sparsely as compared with tires designed for on-road use in order to obtain traction, braking and cornering force by offering more deeply engagement between blocks and rough terrain.

As a result, during running, the block is repeatedly subjected to large stress, and damages such as cracks tend to occur. When the tire is used under extremely severe conditions, for example, in a motocross race, chunking that large pieces of rubber break away from a block may occur in the worst case.

SUMMARY OF THE INVENTION

It is therefore, an object of the present invention to provide a pneumatic tire for running on rough terrain, in which the durability of a block can be improved without sacrificing the traction, braking and cornering performance.

According to the present invention, there is provided a pneumatic tire for rough terrain comprising a tread portion having a tread pattern designed with a land ratio in a range of from 8% to 30%, the tread portion provided with a block having a height in a range of from 10 to 19 mm, the block comprising a top face and a sidewall face extending radially inwardly from a peripheral edge of the top face, the top face having a polygonal shape having a plurality of sides equal to or more than four, the sidewall face comprising a plurality of slant surfaces extending radially inwardly away from said sides, respectively, wherein said each slant surface comprises a radially outer portion and a radially inner portion, the radially outer portion has a flat plane, the radially inner portion comprises a first plane and a second plane laterally adjacent to said first plane, and the first plane and second plane cross each other so that said radially inner portion dents inwardly of the block.

Preferably, in the pneumatic tire in accordance with the present invention, the slant surface of the block has an intersection between the radially outer portion and the radially inner portion and the intersection has a v-shape including a pair of inclined elements in a front view of said slant surface.

Preferably, in the pneumatic tire in accordance with the present invention, each of the inclined elements of the intersection has a radial component height in a range of from 1 to 5 mm.

Preferably, in the pneumatic tire in accordance with the present invention, each of the inclined elements of the intersection has an angle of from 5 to 30 degrees with respect to a line parallel with the top face of the block.

Preferably, in the pneumatic tire in accordance with the present invention, the block has a first cross section being parallel with the top face and across the respective radially inner portions of slant surfaces, and the first cross section is a star-polygonal shape having double sides with respect to the polygonal shape of the top face of the block.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflated to a standard pressure but loaded with no tire load.

The standard wheel rim means a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure means the maximum air pressure for the tire specified by the same organization in the Air-pressure/Maximum-load Table or similar list. The standard pressure is the "maximum air pressure" in JATMA, the "Inflation Pressure" in ETRTO, and the maximum pressure given in the "Tire Load Limits at various cold Inflation Pressures" table in TRA or the like.

In case that the tire has not been based on officially approved standard or the like, recommended wheel rim and pressure by the tire manufactures are used as the standard wheel rim and pressure, respectively.

BRIEF DESCRIPTION OF THE DRAWINGS

FIG. 3A is a cross sectional view of the block taken along line A1-A1 in FIG. 2.

FIG. 3B is a cross sectional view of the block taken along line A2-A2 in FIG. 2.

DESCRIPTION OF THE PREFERRED EMBODIMENTS

Figure 1:
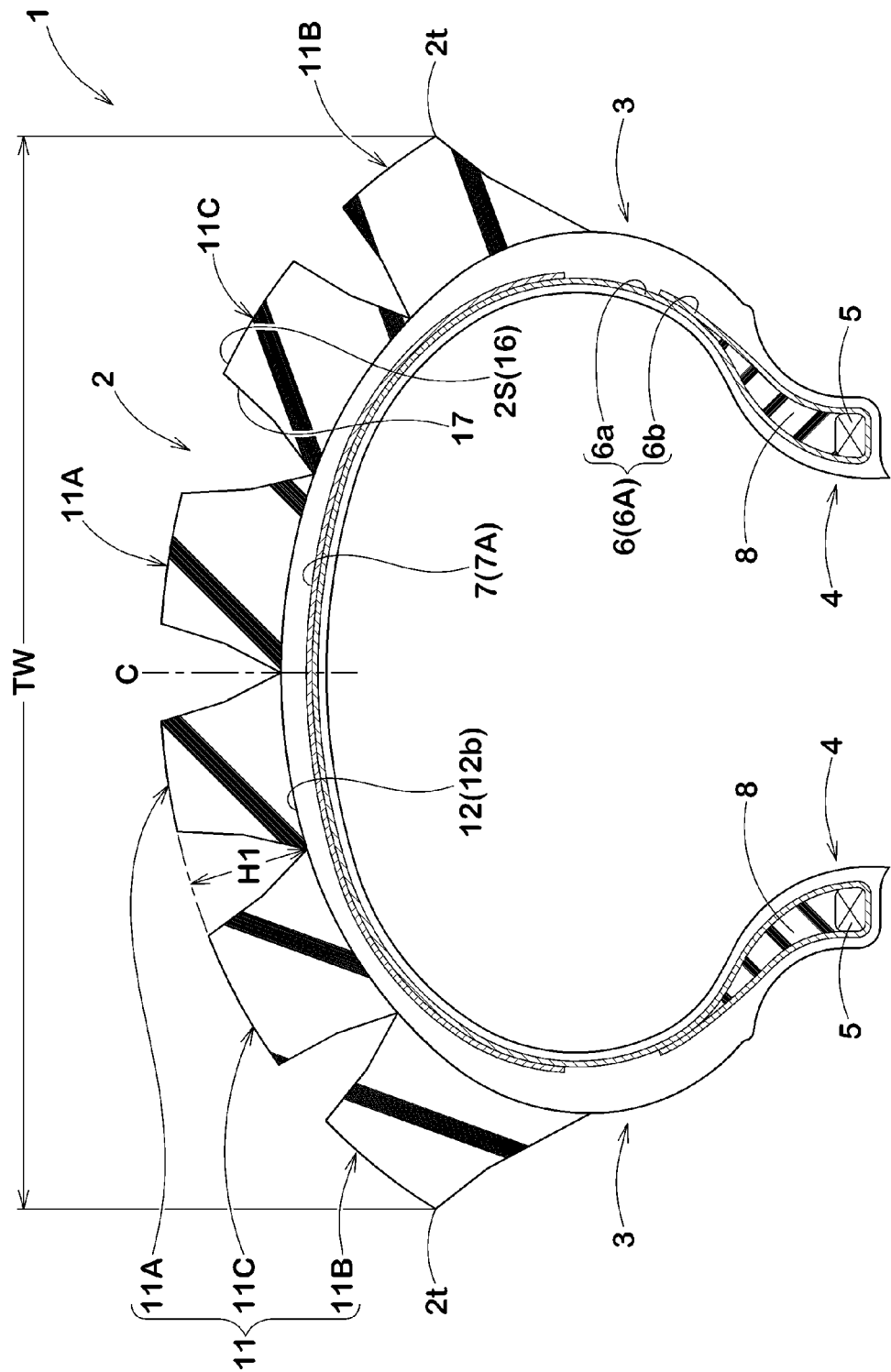
FIG. 1 is a cross sectional view of a pneumatic tire for running on rough terrain as an embodiment of the present invention.

Embodiment of the present invention will now be described in detail in conjunction with accompanying drawings.

In the drawings, a pneumatic tire 1 as an embodiment of the present invention is illustrated as an off-road motorcycle tire which is designed for suitably running on rough terrain such as sand or muddy road with high performance.

Referring to FIG. 1, a pneumatic tire 1 for running on rough terrain in accordance with the present invention comprises a tread portion 2, a pair of bead portions 4 each with a bead core 5, a pair of sidewall portions 3 extending from the tread portion 2 to the bead portions 4, a carcass 6 extending between the bead portions 4 through the tread portion 2 and sidewall portions 3 and a tread reinforcing layer 7 disposed radially outwardly of the carcass 6 in the tread portion 2.

As a characteristic of a motorcycle tire, the tread portion 2 is convexly curved so that the tread face 2S between the tread edges 2t, 2t is curved like an arc swelling radially outwardly, and the maximum cross sectional width of the tire 1 occurs between the tread edges 2t, namely, equals to the axial tread width TW.

The carcass 6 is composed of at least one ply 6A of carcass cords extending between the bead portions 4 through the tread portion 2 and sidewall portions 3. In this embodiment, the ply 6A comprises a main portion 6a extending between the bead portions 4 and a pair of turned-up portions 6b each turned up around the bead core 5 from axially inside to the outside of the tire. A bead apex rubber 8 which extends and tapers from the bead core is disposed between the main portion 6a and the turned-up portion 6b in order to enhance the rigidity of bead portion 4.

The carcass cords are arranged at angle of from 65 to 90 degrees with respect to a circumferential direction of the tire. For the carcass cords, organic fiber cords are preferably used. As to the carcass structure, a radial ply structure or a bias ply structure in which the carcass cords are arranged at angles of from 15 to 45 degrees with respect to the circumferential direction of the tire can be employed.

The tread reinforcing layer 7 comprises at least one ply 7A of organic fiber cords arranged at angle of from 20 to 50 degrees with respect to the circumferential direction of the tire.

The tread portion 2 is provided with a plurality of blocks 11 arranged sparsely. Each block 11 protrudes from the bottom 12b of the sea area 12 of the tread portion 2. As shown in FIG. 1, the bottom 12b of the sea area 12 of the tread portion 2 has a profile which is curved similarly to the profile of the outer surface of the carcass 6.

Here, the "sea area" means the area surrounding the blocks 9 and corresponding to the "grooved area" of the tread portion of a tire for passenger cars, truck/bus and the like.

In this embodiment, the land ratio (SL/S) is set in a range of from 0.08 to 0.3, more preferably in a range of from 0.10 to 0.26, in order to increase the digging of the blocks into the ground and thereby to produce a large drive power, but not to trap the mud and the like between the blocks. Incidentally, the land ratio (SL/S) is well known in the art, a ratio of the ground contacting area SL (or the total area of the top faces 16 of all blocks 11) to the gross area S of the tread portion 2.

Preferably, the block 11 has a height H1 in a range of from 10 to 19 mm. When the height H1 is less than 10 mm, it may be difficult to increase the digging of the blocks into the ground and thereby to produce a large drive power. On the other hand, when the height H1 is more than 19 mm, it may be difficult to obtain the driving power since the block 11 has low bending rigidity. Preferably, the height H1 of the block 11 is set in a range of from 13 to 17 mm.

The blocks 11 comprise a plurality of center blocks 11A arranged both sides the tire equator C, a plurality of shoulder blocks 11B arranged along the tread edges 2t, a plurality of middle blocks 11C arranged between the center blocks 11A and shoulder blocks 11B. Thus, the tread portion 2 suitably comes into contact on the ground during not only driving straight ahead, but also cornering, and thereby the tire 1 may improve traction, braking and cornering performance.

Figure 2:
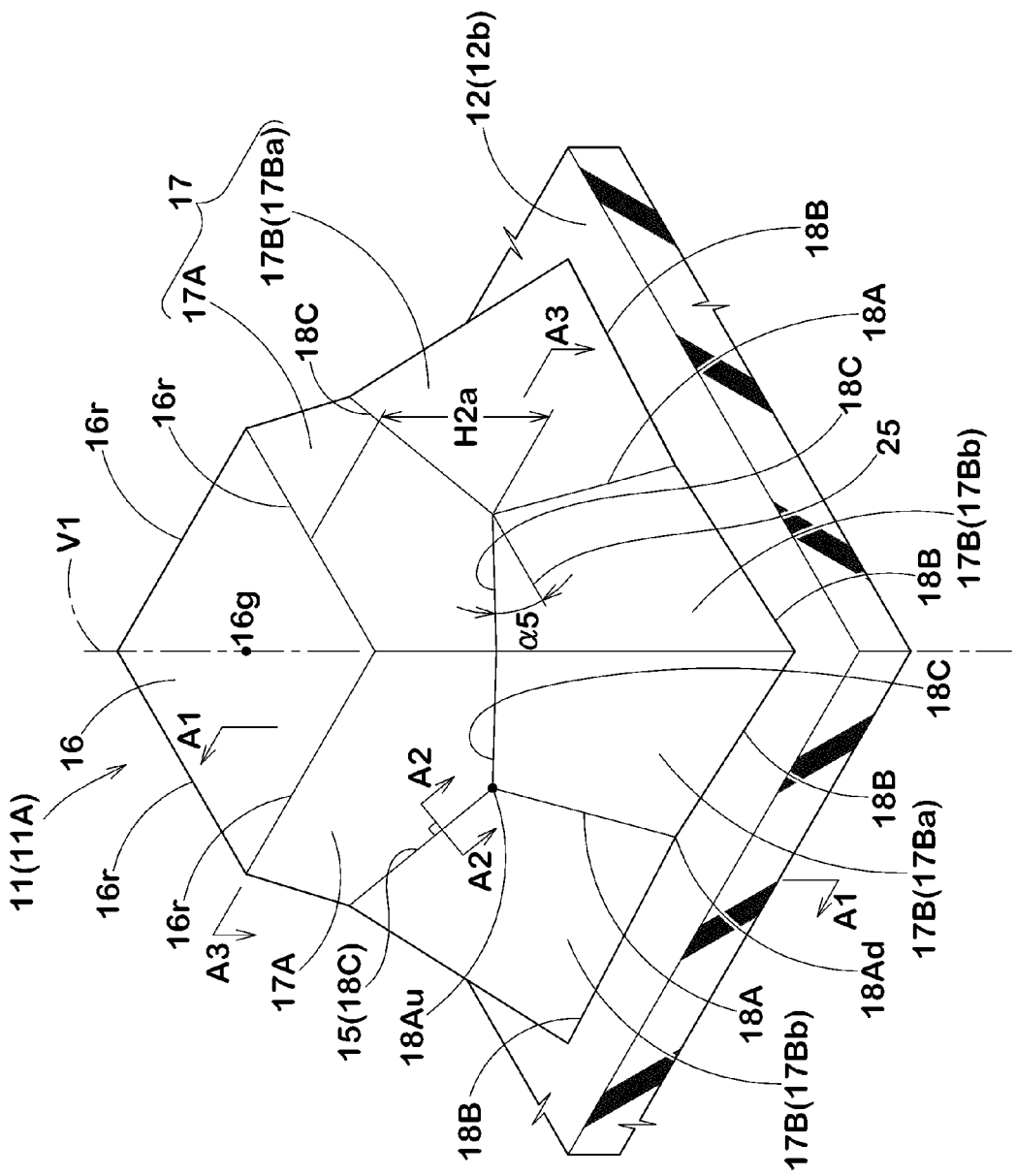
FIG. 2 is an enlarged perspective view of a block of FIG. 1.

FIG. 2 shows a perspective view of the center block 11A as the one embodiment of the block 11. The block 11 comprising a top face 16 and a sidewall face extending radially inwardly from the peripheral edge of the top face 16. The top face 16 has a polygonal shape having a plurality of sides 16r equal to or more than four. In this embodiment, the top face 16 has a quadrilateral shape having four sides 16r in order to improve traction, braking and cornering performance of the tire.

Here, when the number of sides 16r is less than four, it may be difficult to achieve the advantage above. On the other hand, when the number of sides 16r of the top face 16 is too large, damages such as chipping or uneven wear due to low rigidity of the top face 16 may occur on the block 11. Thus, the number of the sides 16r is preferably in a range of from 4 to 6.

The sidewall face of the block 11 comprises a plurality of slant surfaces 17 each extending radially inwardly away from said sides 16r, respectively. Namely, each slant surface 17 extends radially inwardly being away from a normal line V1 which is perpendicular to the centroid 16g of the top face 16 of the block 11.

FIG. 3A is a cross sectional view of the block 11 taken along line A1-A1 in FIG. 2. Referring to FIGS. 2 and 3A, each slant surface 17 comprises a radially outer portion 17A connected to the top face 16 and a radially inner portion 17B connected to the bottom 12b of the sea area 12 of the tread portion 2.

The radially outer portion 17A has a flat plane which extends from the side 16r radially inwardly of the block. The radially outer portion 17A helps to enhance the rigidity at the side of the top face 16 of the block 11 while maintaining digging performance on the ground. Thus, the traction, braking and cornering performance of the tire may improve when running on a hard road as well as a soft road.

Preferably, the maximum height H2a of the radially outer portion 17A is set in a range of from 3 to 8 mm. When the maximum height H2a is less than 3 mm, the advantage above may not be sufficiently obtained. On the other hand, when the maximum height H2a is more than 8 mm, damages such as chunking may occur around a boundary between the radially outer portion 17A and the radially inner portion 17B due to stress concentrate thereto. Thus, the maximum height H2a is more preferably in a range of from 4 to 6 mm.

The radially inner portion 17B comprises a first plane 17Ba and a second plane 17Bb laterally adjacent to the first plane 17Ba, and the first plane 17Ba and second plane 17Bb cross each other so as to dent inwardly of the block 11.

The slant surface 17 is provided with: a first intersection 18A where the first plane 17Ba and second plane 17Bb cross each other; a second intersection 18B where the inner portion 17B and the bottom 12b of the sea area 12 of the tread portion 2 cross each other; and a third intersection 18C where the radially outer portion 17A and the radially inner portion 17B cross each other. In this embodiment, the first intersection 18A has a radially inner end 18Ad being connected to the second intersection 18B and a radially outer end 18Au being connected to the third intersection 18C.

FIG. 3B shows a cross sectional view which is orthogonal to the third intersection 18C of the block 11 taken along line A2-A2 in FIG. 2. Referring to FIG. 3B, the radially inner portion 17B slants at an angle α2 in a range of from 3 to 12 degrees, more preferably in a range of from 5 to 10 degrees with respect to the radially outer portion 17A. Thus, a large deformation of the block while traveling may be prevented by offering relatively high rigidity in the base portion of the block 11.

Accordingly, since the block 11 may surely dig into the ground and each slant surface 17 obtains high friction force against the ground, the traction, braking and cornering performance of the tire is improved.

Additionally, the block 11 helps to increase surface area of the inner portion 17b of each slant surface 17 by offering the first and second planes 17Ba and 17Bb which cross so as to dent. Thus, when the tire 1 is traveling on loose terrain such as mud or sand, since the inner portion 17B of the block 11 has a dent, it surely holds and scoops mud or sand using the dent, and thereby traction, braking and cornering performance of the tire may be further improved. Even if wear occur in the block 11, the advantage described above may continue as long as the inner portion 17 is remaining.

Figure 4A:
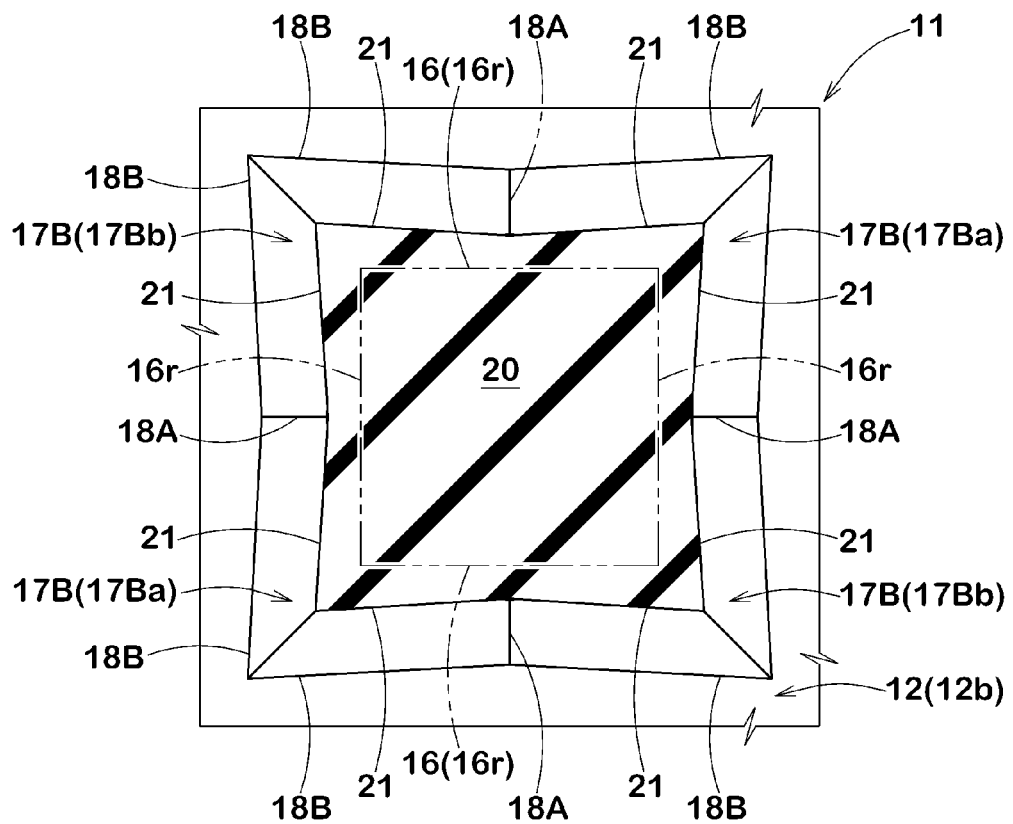
FIG. 4A is a cross sectional view of the block taken along line A3-A3 in FIG. 2.

FIG. 4A shows a cross sectional view of the block 11 taken along line A3-A3 in FIG. 2. Referring to FIG. 4A, the block 11 has a first cross section 20 being parallel with the top face 16 and passing through said respective inner portions 17B of slant surfaces 17. In this embodiment, the first cross section 20 of the block 11 is a star-polygonal shape having double sides 21 (eight sides 21 in this embodiment) with respect to the polygonal shape of the top face 16 (four sides 16r in this embodiment). Thus, in the event that the block 11 has been worn so that the first cross section 20 appears as the top face 16 of the block 11, peripheral sides 21 of the first cross section 20 may still improve traction, braking and cornering performance of the tire.

Figure 4B:
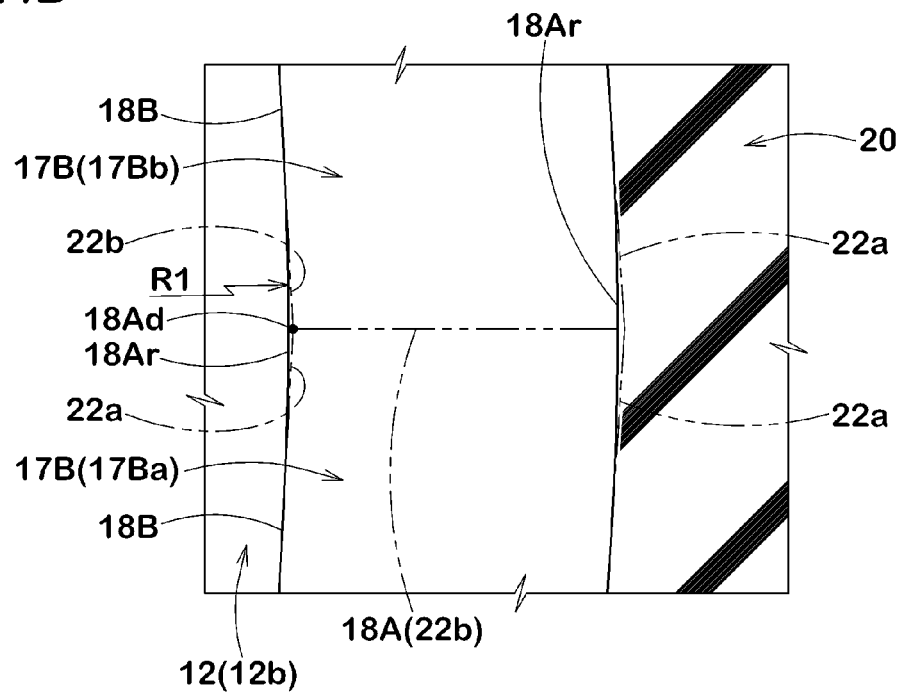
FIG. 4B is an enlarged view of a part of FIG. 4A.

FIG. 4B shows an enlarged view of a part of FIG. 4A. Referring to FIG. 4B, the first intersection 18A preferably includes a chamfered portion 18Ar which protrudes toward the internal of the block. This chamfered portion 18Ar reduces stress concentration on the first intersection 18A so that the damages such as chunking may be prevented. Preferably, the radius of curvature R1 of the chamfered portion 18Ar is in a range of from 1 to 10 mm.

In a portion that the chamfered portion 18Ar is provided between the first and second planes 17Ba, 17Bb, the first intersection 18A is defined as the position that is a boundary 22b between the extended first plane 22a and the extended second plane 22b.

Figure 5A:
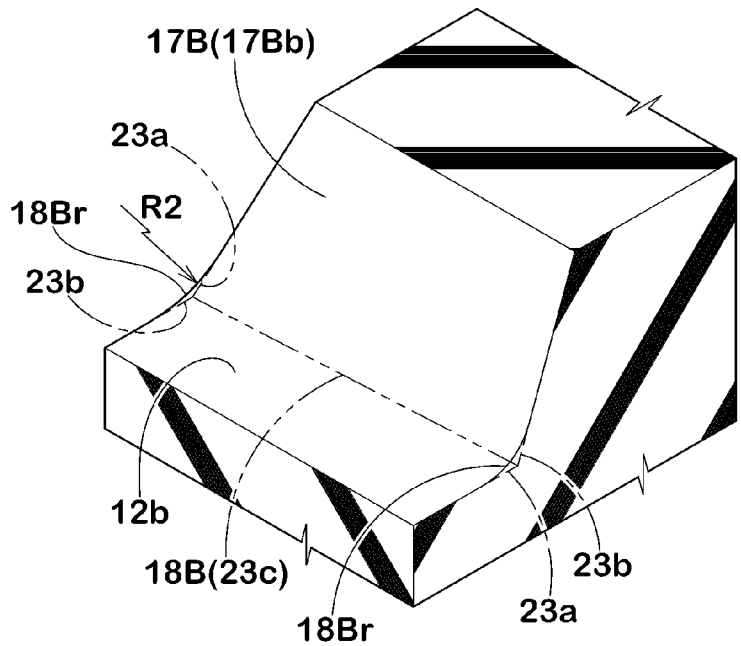
FIGS. 5A and 5B are partial perspective views of blocks.

FIG. 5A shows a partial perspective view of a base portion of the block 11. Referring to FIG. 5A, the second intersection 18B includes a chamfered portion 18Br which connects in between the bottom 12b of the sea area 12 of the tread portion 2 and the inner portion 17B. This chamfered portion 18Br effectively reduces stress concentration on the second intersection 18B when traveling. Preferably, the radius of curvature R2 of the chamfered portion 18Br is in a range of from 1 to 10 mm.

In a portion that the chamfered portion 18Br is provided between the bottom 12b of the sea area 12 of the tread portion 2 and the inner portion 17B, the second intersection 18B is defined as the position that is a boundary 23c between the extended bottom 23a of the sea area of the tread portion 2 and the extended inner portion 23b.

Referring to FIG. 2, the third intersection 18C has a V-shape in the front view of the slant surface 17. Namely, the third intersection 18C includes a pair of inclined elements each of which extends from the both ends on the slant surface 17 toward the bottom 12b of the sea area 12 of the tread portion 2. This helps to reduce damages such as cracks or chunking of the block.

In order to further improve advantages above, the third intersection 18C preferably has a radial component height L4 (shown in FIG. 3A) in a range of from 1 to 5 mm, more preferably in a range of from 2 to 4 mm.

Similarly, the inclined elements of the third intersection 18C preferably have an angle α5 in a range of not less than 5 degrees, more preferably not less than 10 degrees, but preferably not more than 30 degrees, more preferably not more than 25 degrees with respect to a straight line 25 which is parallel with the top face 16 of the block.

Figure 5B:
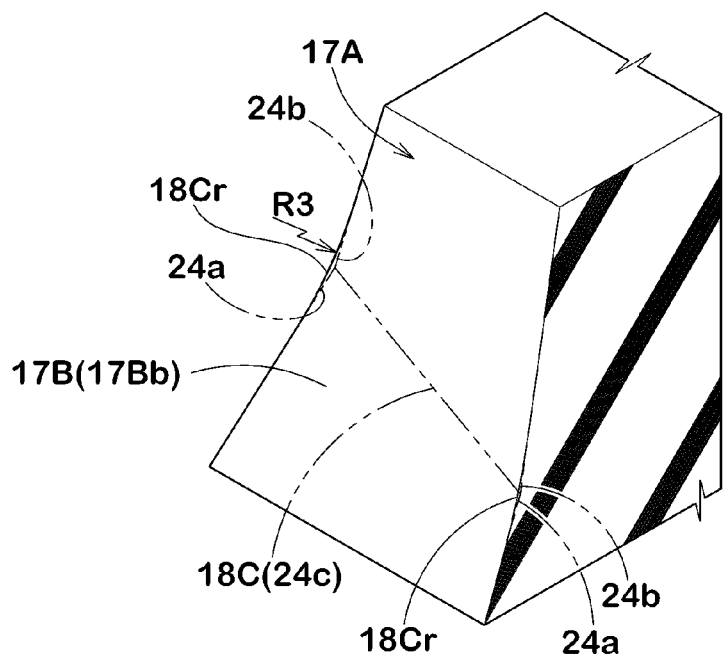

FIG. 5B shows a partial perspective view of a boundary between the radially outer and inner portions 17A and 17B of the block 11. Referring to FIG. 5B, the third intersection 18C preferably includes a chamfered portion 18Cr which connects in between the radially outer and inner portions 17A and 17B. This chamfered portion 18Cr also reduces stress concentration on the third intersection 18C during traveling. Preferably, the radius of curvature R3 of the chamfered portion 18Br is in a range of from 1 to 10 mm.

In a portion that the chamfered portion 18Cr is provided between the radially outer and inner portions 17A and 17B, the third intersection 18C is defined as the position that is a boundary 24c between the extended outer portion 24b and the extended inner portion 24a.

The present invention is more specifically described and explained by means of the following Examples and References. It is to be understood that the present invention is not limited to these Examples.

Comparison Tests

Figure 6:
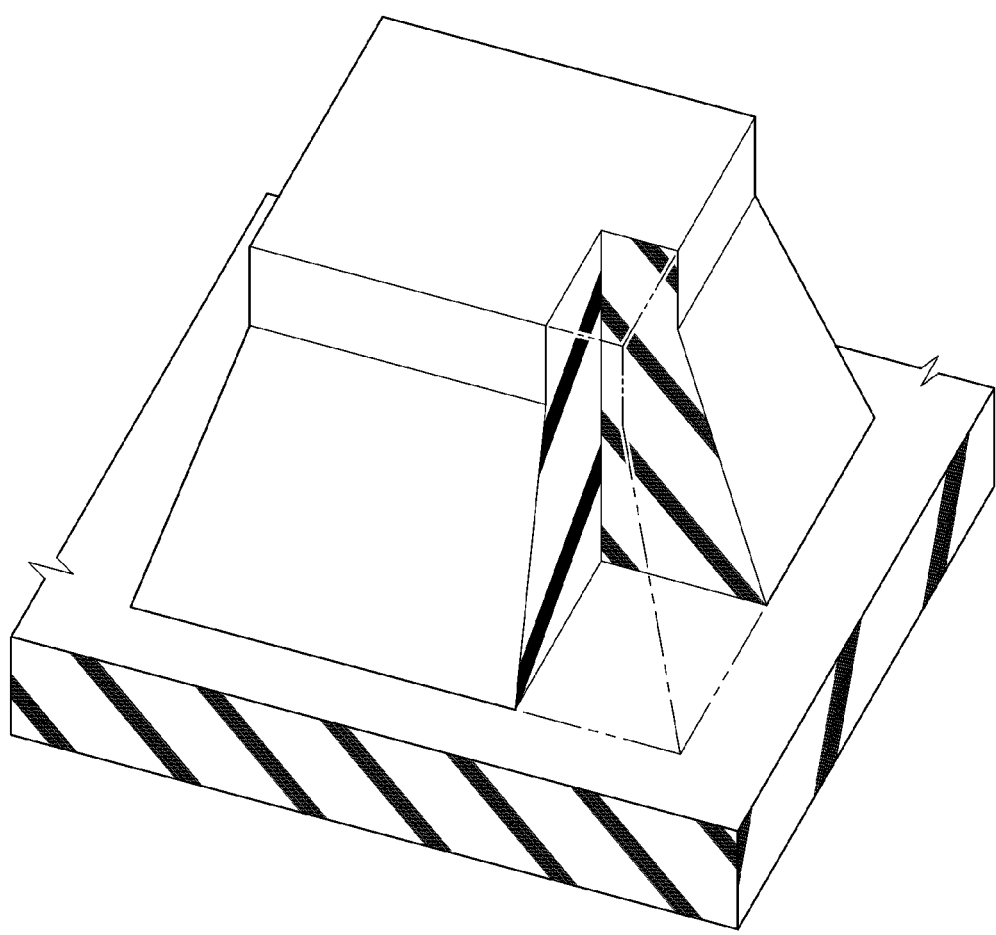
FIG. 6 is a perspective view of a block showing a Reference 1.

Motorcycle tires having the internal structure shown in FIG. 1 and tread blocks shown in FIG. 2 or FIG. 6, except for the details specifications shown in Table 1 were prepared and tested. The Major specifications of the tires and rims are as follows.

Tire Size

Front: 80/100-21 51M

Rear: 120/80-19 63M

Rim Size

Front: 21×1.60

Rear: 19×2.15

Tread Width

Front: 90 mm

Rear: 130 mm

Land ratio: 23%

Block height: 16 mm

Test methods are as follows.

Traction, Braking and Cornering Test:

In the test, using a 450 cc motocross bike, a test rider evaluated the traction, braking and cornering performance based on his feeling during running on a motocross course. The results are indicated in Table 1 by a score based on comparative tire Ref.1 being 100, wherein the larger the value, the better the performance is (Tire pressure: 80 kPa).

Chunking Resistance:

After running on the motocross course for 30 minutes thrice under a full throttle condition, the number of the blocks in which chunking occurred was counted for each tire. The results are indicated in Table 1 by an index based on comparative tire Ref.1 being 100, wherein the larger the value, the better the resistance is.

Traction, Braking and Cornering Test After Wearing 50%:

After wearing each tread block 50% down, the mentioned-above "Traction, braking and cornering test" was performed. The results are indicated in Table 1 by a score based on comparative tire Ref.1 being 100, wherein the larger the value, the better the performance is.

As described above, in the pneumatic tire according to the present invention, the occurrence of chunking is effectively prevented while maintaining the traction, braking and cornering performance can be improved.

TABLE 1

|  | Ref. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Block appearance | FIG. 6 | FIG. 2 | FIG. 2 | FIG. 2 | FIG. 2 | FIG. 2 | FIG. 2 | FIG. 2 | FIG. 2 |
| Radially outer portion height H2a (mm) | 3.0 | 2.0 | 3.0 | 5.0 | 8.0 | 9.0 | 5.0 | 5.0 | 5.0 |
| Radial component height of third intersection L4(mm) | — | 3.0 | 3.0 | 3.0 | 3.0 | 3.0 | 0.5 | 1.0 | 5.0 |
| Radially inner portion slant angle α2 shown in FIG. 3 (deg.) | — | 7 | 7 | 7 | 7 | 7 | 7 | 7 | 7 |
| Third intersection angle α5 (deg.) | — | 20 | 20 | 20 | 20 | 20 | 3 | 7 | 30 |
| The number of sides of top face | 4 | 4 | 4 | 4 | 4 | 4 | 4 | 4 | 4 |
| The number of sides of top face after wearing | 4 | 8 | 8 | 8 | 8 | 8 | 8 | 8 | 8 |
| traction, braking and cornering performance (Score) | 100 | 104 | 107 | 110 | 110 | 110 | 102 | 105 | 105 |
| Chunking resistance (Index) | 100 | 104 | 105 | 105 | 104 | 102 | 101 | 102 | 105 |
| traction, braking and cornering performance after wearing 50% (Score) | 100 | 103 | 103 | 103 | 103 | 103 | 101 | 100 | 100 |

The invention claimed is:

1. A pneumatic tire for rough terrain comprising
a tread portion having a tread pattern designed with a land ratio in a range of from 8% to 30%,
the tread portion provided with a block having a height in a range of from 10 to 19 mm,
the block comprising a top face and a sidewall face extending radially inwardly from a peripheral edge of the top face,
the top face having a polygonal shape having a plurality of sides equal to or more than four,
the sidewall face comprising a plurality of slant surfaces each extending radially inwardly from said sides,
wherein said each slant surface comprises a radially outer portion and a radially inner portion,
the radially outer portion has a flat plane,
the radially inner portion comprises a first plane and a second plane laterally adjacent to said first plane,
the first plane and second plane cross each other so that said radially inner portion dents inwardly of the block,
said slant surface of the block has an intersection between the radially outer portion and the radially inner portion, and
the intersection has a V-shape including a pair of inclined elements in a front view of said slant surface.

2. The pneumatic tire according to claim 1, wherein each of the inclined elements of the intersection has a radial component height in a range of from 1 to 5 mm.

3. The pneumatic tire according to claim 1, wherein each of the inclined elements of the intersection has an angle of from 5 to 30 degrees with respect to a line parallel with the top face of the block.

4. The pneumatic tire according to claim 1, wherein the block has a first cross section being parallel with the top face and across the respective radially inner portions of slant surfaces, and
the first cross section is a star-polygonal shape having double sides with respect to the polygonal shape of the top face of the block.

* * * * *